Patented July 9, 1946

2,403,758

UNITED STATES PATENT OFFICE 2,403,758

ASYMMETRICAL DITERTIARY PEROXIDES

Frederick F. Rust, Berkeley, Frank H. Dickey, Oakland, and Edward R. Bell, Berkeley, Calif., assignors to Shell Development Company, San Francisco, Calif., a corporation of Delaware No Drawing. Application October 4, 1943, Serial No. 504,980

9 Claims. (Cl. 260—610)

The present invention relates to the synthesis of a novel class of compounds comprising certain asymmetrical organic peroxides and more particularly pertains to the preparation of novel organic peroxides in which the two radicals attached to the peroxy (—O—O—) radical are dissimilar or asymmetrical tertiary organic radicals. The invention is also directed to a process for the preparation of organic peroxides in which both radicals attached to the two oxygen atoms of the peroxy radicals are tertiary organic radicals. In one of its more specific embodiments the invention covers a novel group of dialkyl peroxides in which the two organic radicals attached to the peroxy oxygen atoms are dissimilar and are each connected to said oxygen atoms via a tertiary carbon atom of aliphatic or alicyclic character, i. e. a carbon atom which is directly attached to three other carbon atoms.

It has recently been proposed to produce symmetrical di(tertiary alkyl) peroxides by a controlled non-explosive oxidation of hydrocarbons containing at least one tertiary carbon atom of aliphatic character, this oxidation being effected with oxygen in the presence of certain catalysts such as hydrogen bromide and at elevated temperatures which, however, are below those at which spontaneous combustion of the mixture occurs. For example, the treatment of substantially equivolumetric amounts of isobutane and oxygen in the presence of hydrogen bromide at a temperature of between about 150° C. and about 200° C. results in the oxidation of the isobutane with the resultant formation of di(tertiary butyl) peroxide. Similarly other di(tertiary alkyl) peroxides may be formed. It is to be noted, however, that the dialkyl peroxides formed in accordance with the above process always contain two like tertiary radicals; in other words, these dialkyl peroxides are symmetrical.

It is a principal object of the invention to provide a simple, efficient and reliable process of producing asymmetrical organic peroxides in which the two organic radicals attached to the peroxy oxygen atoms may be dissimilar in configuration, e. g. contain a dissimilar number of carbon atoms and/or different substituents, and in which each of said radicals is attached to the peroxy oxygen atom via a tertiary carbon atom of aliphatic or alicyclic character.

The present invention is predicated on the discovery that organic hydroperoxides in which the organic radical is directly attached to the peroxy radical via a tertiary carbon atom, i. e. one which is also directly bound to three other carbon atoms, may be reacted with certain substituted or unsubstituted tertiary alcohols described herein to produce the aforementioned diperoxides in which both of the radicals are attached to the peroxy oxygen atoms via a tertiary carbon atom. More specifically stated, the invention resides in the preparation of novel peroxides by reacting a tertiary organic hydroperoxide of the general formula

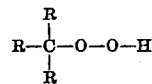

wherein each R represents a like or different organic radical and preferably a substituted or unsubstituted aliphatic radical, with substituted or unsubstituted tertiary alcohols in the presence of an acid or acid-acting material, preferably an aqueous solution of an inorganic acid such as sulfuric acid. This method of preparation, which is of broad and general application, results in the preparation of the aforementioned and hereinbelow more fully described class of novel organic peroxides in which both radicals are attached to the peroxy oxygen atoms via tertiary carbon atoms, which organic peroxides may have similar or different radicals attached to the peroxy radical, depending on the specific hydroperoxide and the tertiary alcohol employed as the reactants.

Although the tertiary hydroperoxides employed as one of the reagents in the manufacture of the novel diperoxides may be produced by the use of several different processes, an advantageous method of preparing these hydroperoxides, such as the tertiary alkyl hydroperoxides of the type of tertiary butyl hydroperoxide, comprises the controlled, non-explosive catalytic oxidation of the corresponding hydrocarbon containing at least one tertiary carbon atom of aliphatic character, this oxidation being effected for example in the presence of hydrogen bromide and under conditions of temperature and pressure and residence time which favor the formation of the particular tertiary hydroperoxide. This method of preparing the hydroperoxides, besides simplicity and relative cheapness of operation and of the reactants, possesses the additional advantage of forming a reaction mixture which may be directly reacted with the substituted or unsubstituted tertiary alcohols in accordance with the process of the present invention without the necessity of conducting any preliminary, costly and time-consuming treatment of such reaction mixture to separate therefrom the tertiary hydroperoxide.

Another method of producing a tertiary alkyl hydroperoxide such as tertiary butyl hydroperoxide includes the step of treating a tertiary alkyl alcohol with aqueous hydrogen peroxides in the presence of a dehydrating agent of the type of anhydrous sodium sulfate. Still another method comprises the formation of an acid monoalkyl hydrogen sulfate, e. g. the hydrogen sulfate, formed by reacting isobutylene with aqueous sulfuric acid solution, reacting this monoalkyl sulfate with hydrogen peroxide, neutralizing the resulting reaction product, and recovering the hydroperoxide (which is tertiary butyl hydroperoxide when isobutylene is one of the starting materials). Although tertiary alkyl hydroperoxides, which are employed as one of the starting materials in the production of ditertiary peroxides and particularly of the novel asymmetrical ditertiary peroxides according to the present process, may be produced by the last two described methods, these methods of producing the hydroperoxides are less economical than the aforementioned process which comprises the controlled non-explosive oxidation of hydrocarbons and particularly saturated hydrocarbons containing a tertiary carbon atom with oxygen in the presence of hydrogen bromide. This is due to the relatively high cost of hydrogen peroxide and to the fact that the two processes mentioned above (which processes use hydrogen peroxide as a starting material in the production of the hydroperoxide) necessitate further treatment of the reaction products to separate therefrom the tertiary hydroperoxides, e. g. tertiary alkyl hydroperoxide, substantially in a pure state prior to its interaction with the tertiary alcohols in accordance with the process of the present invention.

As mentioned above, any hydroperoxide in which the organic radical is attached to the hydroperoxy radical via a tertiary carbon atom may be used as one of the reagents or reactants in the manufacture of the diorganic peroxides in accordance with the process of the present invention. A particularly suitable group of such hydroperoxides includes or comprises tertiary alkyl hydroperoxides. The following are illustrative examples of such tertiary alkyl hydroperoxides which may be formed, for example, by the aforementioned controlled oxidation and which may be used as one of the reactants in the manufacture of the novel asymmetrical dialkyl peroxides in accordance with the process of the present invention: tertiary butyl hydroperoxide, tertiary amyl hydroperoxide and their homologues and analogues such as the tertiary alkyl hydroperoxides formed by the substitution of the hydroperoxyl (—O—O—H) radical for the hydrogen atom on one or more of the tertiary carbon atoms of such saturated aliphatic hydrocarbons as 2-ethyl butane, 2-methyl pentane, 3-methyl pentane, 2,3-dimethyl butane, 2,4-dimethyl pentane, and their homologues. Also, suitable substitution products such as the tertiary alkyl hydroperoxides in which a halogen atom or atoms are attached to one or more of the carbon atoms (other than the one carrying the hydroperoxyl radical) may be reacted with the tertiary alcohols in accordance with the process of the present invention to produce ditertiary alkyl peroxides including the novel asymmetrical di(tertiary alkyl) peroxides. Such halo-substituted tertiary hydroperoxides may, for example, be obtained by the controlled oxidation with oxygen in the presence of hydrogen bromide of halogenated saturated aliphatic hydrocarbons of the type of 1-halo-2-methyl propane, 1-halo-2-ethyl propane, 1-halo-2-methyl butane, 1-halo-3-methyl butane, 2-halo-3-methyl butane, and the like. Still another group of hydroperoxides which may be thus employed in the process of the present invention includes compounds wherein one or more of the aliphatic radicals attached to the tertiary carbon atom (which is directly attached to the peroxy radical) is substituted by or contains attached thereto an aryl, alkaryl, aralkyl and/or alicyclic radical which may or may not be further substituted.

It was stated above that the process of the present invention comprises the reaction of a hydroperoxide, particularly a tertiary alkyl hydroperoxide, with a tertiary alcohol. Although any organic compound which contains a hydroxy radical attached to a tertiary carbon may be employed as the substance which is reacted with the above-mentioned hydroperoxide in accordance with the process of the present invention, the process is especially suitable when applied to the use of aliphatic and alicyclic tertiary alcohols. The following are illustrative examples of aliphatic tertiary alcohols which may be thus employed: tertiary butyl alcohol, tertiary amyl alcohol, 2-methyl-pentanol-2, 3-methyl-pentanol-3, 2,3-dimethyl-butanol-2, 2,3,3-trimethyl butanol-2, and the like and their homologues and suitable substitution products such as those in which various substituents are present in lieu of one or more of the hydrogen atoms of the above-defined class or group of tertiary alcohols. For instance, halo-substituted tertiary alcohols, such as 1-bromo-2-methyl propanol-2, 1-chloro-2-methyl propanol-2, 1,1-dichloro-2-methyl propanol-2, 1,3-dichloro-2-methyl propanol-2, 1-chloro-2-methyl butanol-2, 3-chloro-2-methyl butanol-2, 4-chloro-2-methyl butanol-2, 3-bromo-2-methyl butanol-2, 1,2-dichloro-2-methyl butanol-2, 1-chloro-2-methyl pentanol-2, 2-chloro-3-methyl pentanol-3, 3-chlormethyl pentanol-3, 3-chloro-2,3-dimethyl butanol-2, and the like and their homologues, may be reacted with the hydroperoxides of the above class. Another subgroup of the tertiary alcohols includes the alicyclic tertiary alcohols of the type of 1-methyl cyclopentanol-1, dimethyl cyclopropyl carbinol, 1-methyl cyclohexanol-1, 1-ethyl cyclopentanol-1, 1,3-dimethyl cyclopentanol-1, 1-methyl cycloheptanol-1, 1-ethyl cyclohexanol-1, and the like, as well as the suitable substitution products such as their halo-substituted derivatives. Also, tertiary alcohols containing two or more hydroxyl radicals, at least one of which is attached to a tertiary carbon atom, such as the glycols containing a hydroxyl radical attached to a tertiary carbon atom, may be used. Still another group comprises tertiary alcohols which may contain one or more hydroxyl radicals and which contain aryl, alkaryl and/or aralkyl radicals attached to the tertiary alcohol radical.

The reaction between the hydroperoxides and the above mentioned tertiary alcohols in accordance with the process of the present invention is effected in the presence of an acid or acid acting catalyst, such as sulfuric acid, phosphoric acid, hydrochloric acid, hydrobromic acid, the sulfonic acids of benzene and its homologues, and the like. When resort is had to an inorganic acid, it is preferred to operate with sulfuric acid, preferably of between about 50% and 75% strength. Although higher and lower concentrations of these acid catalysts may also be employed in some instances, generally it is advisable to refrain from using acids or acid acting materials of excessively high concentrations because of the interaction of such acids with the hydroperoxides to form undesirable by-products. The use of very low concentrations, i. e. weak acids, will as a rule decrease the rate of conversion and yields and thus may render the process uneconomical. Particularly good results have been produced when aqueous sulfuric acid was employed in concentrations of between about 60% and 70%. However, as pointed out above, it is possible to employ aqueous solutions of other acidic or acid acting materials, provided care is taken to maintain suitable temperatures; for instance when relatively strong acids are employed it is preferred to lower the operating temperature so as to prevent on inhibit the undesirable side reactions, while a decrease in the acid strength will generally necessitate a corresponding increase in the operating temperature to permit economical conversions to and yields of the desired tertiary peroxides.

It was pointed out above that the reaction between the hydroperoxides and the tertiary alcohols is preferably effected in an acid or acid acting medium which is preferably in the form of its aqueous solution. Instead of employing such tertiary alcohols per se, it is therefore possible to employ the corresponding reaction products formed, for example, by the absorption of tertiary olefins in aqueous acid solutions, particularly in aqueous solutions of sulfuric acid, it being considered that such products of absorption comprise either the corresponding hydrolyzable esters, e. g. sulfates, or the corresponding tertiary alcohols per se. Irrespective of the theories presented herein, these products of reaction between tertiary olefins and aqueous acid solutions may be reacted with the above-mentioned tertiary hydroperoxides to form the diperoxides and particularly the novel asymmetrical diorganic peroxides.

The reaction between the hydroperoxides and the tertiary alcohols in an acid or acid acting medium may be effected in a batch, intermittent or continuous manner. Although this reaction may be executed within a relatively wide range of temperatures, highly satisfactory yields of the diperoxides may be obtained by conducting the reaction at substantially ordinary or slightly higher temperatures, e. g. in the range of from about 15° C. to about 50° C. The optimum reaction temperature will depend, at least in part, on the specific reactants employed as well as on the optimum strength and amount of the acid or acid acting material used. For example, as will be pointed out hereinbelow, when equimolal amounts of tertiary butyl alcohol and of 65% aqueous sulfuric acid solution are reacted with tert. butyl hydroperoxide, excellent yields of di(tertiary butyl) peroxide are obtained when the reaction is effected at about 30° C. On the other hand, the substitution of tertiary amyl alcohol for the tertiary butyl alcohol in the above reaction will necessitate a somewhat higher reaction temperature, e. g. between about 35° C. and 40° C., in order to produce high yields of the novel tertiary butyl-tertiary amyl peroxide. The reaction is unusually elastic in the sense that any desired proportion of the hydroperoxide, tertiary alcohol and acidic reagent may be employed. However, it is preferred to employ substantially equimolar amounts of all three substances.

The novel class of compounds which may be prepared in accordance with the process of the present invention may be generally represented by the formula:

$$R-O-O-R'$$

wherein R and R' are dissimilar substituted or unsubstituted alkyl radicals. A particular subgroup comprises asymmetrical dialkyl peroxides in which one of the two alkyl radicals is the tertiary butyl radical, while the other alkyl radical is a saturated radical containing at least 5 carbon atoms, the carbon atom of said radical which is directly attached to the oxygen atom of the peroxy radical being also directly attached to 3 other carbon atoms. Compounds which fall within the last mentioned subgroup include the asymmetrical peroxides in which two radicals attached to the peroxy radical are selected from the class of tertiary radicals of the type of tertiary butyl, tertiary amyl, tertiary hexyl or tertiary heptyl radicals or higher homologues thereof, it being noted that in all cases the two radicals attached to the peroxy radical are always dissimilar or asymmetrical. The asymmetrical tertiary peroxides of the present invention may have various substituents attached to the different carbon atoms of either or both radicals, for instance one or more of the hydrogen atoms of an asymmetrical di(tertiary alkyl) peroxide may be substituted by one or more halogen atoms, hydroxyl groups and/or aryl, alkaryl, aralkyl and/or alicyclic radicals. A specific example of the above-defined subgroup of novel compounds is tertiary butyl-tertiary amyl peroxide which, as will be shown, is formed by reacting tertiary butyl hydroperoxide with tertiary amyl alcohol in the presence of an aqueous sulfuric acid catalyst at a temperature of about 35° C. to 40° C. This new compound is a water-white liquid which is substantially immiscible with water, and is substantially unaffected when washed with weak sulfuric acid. This peroxide reacts quantitatively with concentrated hydrogen iodide solution when heated to about 60° C. for one hour in acetic acid solution to yield one mol of iodine per mol of the peroxide.

The following examples are illustrative of the process of the present invention and describe one method of preparing the novel asymmetrical tertiary peroxides. It is to be understood, however, that there is no intention of limiting the invention to any specific details presented in these examples or to the specific asymmetrical compounds produced and described in one of said examples.

*Example I*

Approximately one mol of tertiary amyl alcohol was added to one mol of a 65% aqueous solution of sulfuric acid. Thereafter about 0.83 mol of tertiary butyl hydroperoxide in an 83% aqueous solution was slowly added to the above stirred reaction mixture, and the reaction and stirring were continued for about 2½ hours, during which time the temperature rose to about 35° C. to 40° C. The mixture was then allowed to stand. This standing caused the formation of two liquid phases. The upper layer or phase was then separated and washed with water. It was then washed with a 30% aqueous solution of sulfuric acid and the water washing was again repeated. This water washed product was then distilled with approximately twice its volume of water and a sample boiling between about 91° C. and about 92° C. was thus collected in an amount of about 158 cc. This sample was then dried. An analysis of the dried sample showed that it was tertiary butyl-tertiary amyl peroxide, that it had a refractive index $n_D^{20}$ equal to 1.4000, and a density $d_4^{20}$ equal to 0.811 g./cc. The yield was equal to 121 g. (0.75 mol), which was equal to about 90% based on the tertiary butyl hydroperoxide employed.

*Example II*

Approximately 0.835 mol of tertiary butyl hydroperoxide in an 83% aqueous solution was slowly added over a period of about 20 minutes into a stirred mixture of one mol of tertiary butyl alcohol and one mol of an aqueous 65% solution of sulfuric acid. The reaction temperature was maintained at 30° C. The stirring was continued for about 40 minutes after the addition of the tertiary butyl hydroperoxide, and the mixture was then allowed to stand for about an hour and a half. This caused the separation of the reaction products into two liquid phases, the upper layer of which (comprising 147 cc.) was separated and added to about 70 cc. of water and 150 cc. of tertiary butyl alcohol. The mixture thus formed was then distilled to obtain an azeotropic fraction boiling at 77° C. The azeotrope was then washed with water and with 30% sulfuric acid. An 80% yield of di(tertiary butyl) peroxide was thus obtained, as calculated on the tertiary butyl hydroperoxide introduied.

Substantially the same process may be used for interaction of tertiary butyl hydroperoxide or of its higher homologues, such as tertiary amyl hydroperoxide, with various tertiary alcohols of the class described above, e. g. tertiary hexyl alcohol.

*Example III*

Tertiary amyl hydroperoxide was reacted with a 100% excess of an equimolar mixture of tertiary amyl alcohol and of an aqueous 65% solution of sulfuric acid. This reaction was continued for about 2 hours while maintaining the reactants at substantially room temperature. The reaction mixture was found to separate into two liquid layers. The water-insoluble layer was separately recovered and was washed several times with water, then with a 30% aqueous sulfuric acid, and finally again with water. This material was then subjected to vacuum distillation to separate a fraction boiling at 58.5° C. at 14 mm. of mercury pressure. An analysis of this fraction showed that it was di(tertiary amyl) peroxide. Its refractive index was $n_D^{20}=1.4091$. The determination of the molecular weight by analysis of active oxygen with a 70% hydrogen iodide solution gave the theoretical value of 174 gr./mol. Further confirmation of the fact that the compound thus produced was di(tertiary amyl) peroxide was made by the carbon and hydrogen analysis presented below:

|  | Found | Theory |
|---|---|---|
|  | Per cent | Per cent |
| Carbon | 69.4 | 69.0 |
| Hydrogen | 12.7 | 12.0 |

*Example IV*

Chlorotertiary butyl hydroperoxide was reacted with an excess of an equimolar mixture of tertiary butyl alcohol and a 65% aqueous sulfuric acid solution. The reaction mixture was allowed to stand overnight and was found to form two liquid layers. The upper layer was separated and washed with water, then with a 30% aqueous sulfuric acid solution, and finally with dilute caustic solution. The final product had a refractive index of $n_D^{20}=1.4230$ and a chlorine content of 20.5%. This product was found to be chloroditertiary butyl peroxide, which has the following chemical formula

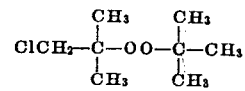

The properties possessed by the novel asymmetrical tertiary peroxides adapt them admirably for use in organic reactions as well as for other purposes. For example, these novel compounds may be used as additives to improve the cetane value of Diesel engine fuels. Also, these peroxides may be employed individually or in admixtures with one another or with other substances, as catalysts for various chemical reactions. For instance, they may be used for the polymerization of polymerizable unsaturated compounds including both the conjugated and the non-conjugated unsaturated polymerizable compounds.

Although unsaturated organic compounds having a single polymerizable olefinic linkage, e. g. styrene, alpha-methyl styrene, many vinyl and allyl derivatives, and the nitriles and many esters of acrylic and alpha-substituted acrylic acids, all of which fall within the class of unconjugated unsaturated polymerizable organic compounds, may be effectively polymerized in the presence of the above-defined class of novel catalysts to produce resins and resin-like substances, of growing importance for resins is another group of unconjugated unsaturated compounds having two or more polymerizable non-conjugated double bonds between carbon atoms of aliphatic character. Examples of these are the unsaturated aliphatic polyesters of saturated polybasic acids, the unsaturated aliphatic polyethers of saturated polyhydric alcohols, and the unsaturated aliphatic esters of unsaturated aliphatic acids. Also included in this class are the polymerizable unsaturated compounds containing in the molecule one or more polymerizable organic radicals and one or more inorganic radicals or elements. Examples of such compounds are the vinyl, allyl and methallyl esters of phosphoric acid and of the ortho acids of silicon, boron, etc.

Another important group of compounds which may be polymerized by the novel asymmetrical ditertiary peroxides of the present invention consists of polymerizable compounds having two or more and preferably two conjugated unsaturated carbon-to-carbon linkages. These compounds are substantially hydrocarbon in character, although they may contain substituents such as halogen, nitro, sulfo, etc. By far the most important subgroup of such compounds comprises the hydrocarbons and substituted hydrocarbons having in the molecule two double bonds in conjugated relationship to one another, these double bonds being between carbon atoms of aliphatic character. Representative examples of such compounds are butadiene-1,3,2-chlorbutadiene-1,3, isoprene, and the higher homologues thereof. In general, the polymerization of conjugated diene hydrocarbons and substituted hydrocarbons in accordance with the invention results in products which are synthetic elastomers in character and as a consequence belong to the general group of substances known as synthetic rubbers.

The invention in one of its phases is applicable to the polymerization of single compounds of the above-outlined groups and to the copolymerization of two or more compounds; for instance in the production of compounds which are synthetic elastomers in character, one or more of the conjugated diene hydrocarbons may be polymerized in accordance with the process described herein and in the presence of the novel asymmetrical peroxide catalysts with one or more of the polymerizable unsaturated compounds of the type of styrene, acrylonitrile, isobutylene, vinyl chloride, methyl methacrylate, and the like. Synthetic resins usually require the addition of one or more plasticizers, stabilizers, lubricants, dyes, pigments, fillers, or other modifiers. Where these modifiers do not chemically react with or otherwise adversely affect the ingredients of the reaction mixture, they may be added to the monomer or other partially polymerized material during the polymerization reaction.

The novel peroxides of the present invention may be used as the polymerization catalysts either alone or in combination with one another or with other catalysts such as benzoyl peroxide, lauroyl peroxide, acetyl peroxide, benzoyl acetyl peroxide, and hydrogen peroxide. The catalysts of the invention are ordinarily dissolved in the polymerizable compounds prior to polymerization. Amounts of catalyst as small as a fraction of a percent based on the weight of the monomer are catalytically effective. Larger percentages have correspondingly greater effect. Too much catalyst is generally to be avoided as likely to render the reaction violent or as adversely affecting the properties of the polymer, particularly as to molecular weight and the ramifications thereof. The amount of catalyst ordinarily varies from about 0.01% to about 5% or more by weight of the monomer.

The polymerization may be carried out in a continuous or discontinuous manner, under atmospheric, superatmospheric or reduced pressures. The polymerization will usually be energized by the application of heat, although both heat and light may be used, and in some cases light alone is sufficient. The invention may be applied to monomeric compounds in the massive state or to dispersions or solutions of the monomer or monomers. Where the dispersion method is employed it is normally desirable to select a dispersing medium insoluble in the catalyst involved. In general, the temperatures customary for similar polymerization reactions under the influence of other catalysts, e. g. benzoyl peroxide, may be used. Depending upon the particular material and the conditions involved, temperatures of from about room temperature to above 200° C. may be used. This usually, although not necessarily, involves the use of superatmospheric pressures.

The term "polymerizable unconjugated unsaturated compounds" as used herein and in the appended claims refers to polymerizable unsaturated compounds which do not have in the molecule conjugated carbon-to-carbon unsaturated linkages between carbon atoms of aliphatic character.

We claim as our invention:

1. Tertiary butyl-tertiary amyl peroxide.
2. An asymmetrical di-alkyl peroxide having the general formula

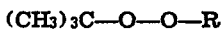

wherein R represents a saturated alkyl radical containing at least five carbon atoms, one of which is a tertiary carbon atom and is directly linked to the peroxy radical.

3. An asymmetrical peroxide having the general formula

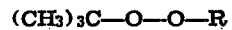

wherein R represents a radical of the group consisting of the saturated aliphatic and saturated cycloaliphatic hydrocarbon radicals which contain at least five carbon atoms and at least one tertiary carbon atom, said radical being directly attached to the peroxy (—O—O—) radical via a tertiary carbon atom.

4. An asymmetrical peroxide having the general formula

wherein R' represents a tertiary alkyl radical which is directly linked to the peroxy radical by a tertiary carbon atom, and R represents a dissimilar radical of the group consisting of the saturated aliphatic and saturated cycloalipahtic hydrocarbon radicals which contain at least five carbon atoms and at least one tertiary carbon atom, the radical represented by R being directly linked to the peroxy radical via a tertiary carbon atom.

5. An asymmetrical peroxide having the general formula

wherein R' represents a tertiary alkyl radical which is directly linked to the peroxy radical by a tertiary carbon atom, and R represents a dissimilar tertiary alkyl radical directly linked to the peroxy radical via a tertiary carbon atom.

6. A process of producing a di-alkyl peroxide which comprises reacting an aqueous sulfuric acid solution with a tertiary olefin, reacting said tertiary alkyl alcohol-containing reaction product with a tertiary alkyl hydroperoxide at a temperature of between about 15° C. and about 50° C., and recovering the di(tertiary alkyl) peroxide thus formed from the reaction mixture.

7. A process of producing a di-alkyl peroxide which comprises reacting tertiary butyl hydroperoxide with tertiary amyl alcohol in the presence of an aqueous sulfuric acid solution and at a temperature of between about 15° C. and about 50° C., and recovering tertiary butyl-tertiary amyl peroxide from the reaction mixture.

8. A process of producing a di-alkyl peroxide which comprises reacting a saturated tertiary alkyl hydroperoxide with a saturated tertiary alkyl alcohol in the presence of an aqueous sulfuric acid solution and at a temperature of between about 15° C. and about 50° C., and recovering the di(tertiary alkyl) peroxide from the reaction mixture.

9. A process of producing a peroxide which comprises reacting a tertiary alkyl hydroperoxide with a saturated tertiary alkyl alcohol in the presence of an aqueous solution of an acid of the group consisting of sulfuric acid and phosphoric acid, and recovering the di-organic peroxide from the reaction mixture.

FREDERICK F. RUST.
FRANK H. DICKEY.
EDWARD R. BELL.